(12) United States Patent
Wang et al.

(10) Patent No.: US 10,673,979 B2
(45) Date of Patent: Jun. 2, 2020

(54) USER DATA SHARING METHOD AND DEVICE

(71) Applicant: ALIBABA GROUP HOLDING LIMITED, Grand Cayman (KY)

(72) Inventors: Fengwei Wang, Hangzhou (CN); Huimei He, Hangzhou (CN); Dongxing Wu, Hangzhou (CN); Dijun He, Hangzhou (CN); Ruihua Lin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 105 days.

(21) Appl. No.: 15/991,784

(22) Filed: May 29, 2018

(65) Prior Publication Data

US 2018/0278716 A1 Sep. 27, 2018

Related U.S. Application Data

(63) Continuation of application No. PCT/CN2016/106579, filed on Nov. 21, 2016.

(30) Foreign Application Priority Data

Dec. 1, 2015 (CN) .......................... 2015 1 0866768

(51) Int. Cl.
*G06F 15/16* (2006.01)
*H04L 29/08* (2006.01)
*G06F 16/00* (2019.01)

(52) U.S. Cl.
CPC ............ *H04L 67/306* (2013.01); *G06F 16/00* (2019.01); *H04L 29/08* (2013.01); *H04L 67/10* (2013.01); *H04L 67/12* (2013.01); *H04L 67/22* (2013.01)

(58) Field of Classification Search
CPC ........ H04L 67/306; H04L 67/22; H04L 29/08
(Continued)

(56) References Cited

U.S. PATENT DOCUMENTS 7,221,935 B2  5/2007  Barriga-caceres et al.
7,225,156 B2  5/2007  Fisher et al.
(Continued)

FOREIGN PATENT DOCUMENTS

CN    102209335 A    10/2011
CN    103780690 A    5/2014
(Continued)

OTHER PUBLICATIONS

Decision for Grant for Japanese Application No. 2018-528317 dated Jun. 4, 2019 (1 page).
(Continued)

*Primary Examiner* — Bharat Barot
(74) *Attorney, Agent, or Firm* — Sheppard Mullin Richter & Hampton LLP (57) ABSTRACT

A user data sharing method comprises: acquiring information of a query medium; obtaining, according to the information of the query medium, at least one user account related to the query medium and relationship information of the at least one user account from a medium network, the relationship information of the user account comprising: a strength of a relationship between the user account and the query medium and a strength of a relationship between the user account and other user accounts; constructing a local medium network by using the obtained at least one user account and relationship information of the at least one user account; determining a trusted account from the at least one user account by using the local medium network; and acquiring user data of the trusted account and outputting the
(Continued)

user data of the trusted account as the user data corresponding to the information of the query medium.

12 Claims, 3 Drawing Sheets

(58) Field of Classification Search
USPC .................................. 709/202–203, 217–219
See application file for complete search history.

(56) References Cited

U.S. PATENT DOCUMENTS

| | | | |
|---|---|---|---|
| 7,519,822 | B2 | 4/2009 | Sayers et al. |
| 7,562,382 | B2 | 7/2009 | Hinton et al. |
| 8,108,266 | B2 | 1/2012 | Drudis et al. |
| 8,184,811 | B1 | 5/2012 | Patten et al. |
| 8,392,266 | B2 | 3/2013 | Lombardi |
| 8,560,630 | B2 * | 10/2013 | Malkhi .................. H04L 67/24 709/217 |
| 8,597,116 | B2 | 12/2013 | Nguyen et al. |
| 8,762,284 | B2 | 6/2014 | Garfinkle et al. |
| 8,918,848 | B2 | 12/2014 | Sharma et al. |
| 9,098,819 | B1 | 8/2015 | Korula et al. |
| 9,515,967 | B2 * | 12/2016 | Wang ...................... H04L 51/04 |
| 9,773,212 | B2 | 9/2017 | Hammad |
| 10,152,477 | B2 * | 12/2018 | Benton ................ H04L 67/104 |
| 10,162,897 | B2 * | 12/2018 | Kang .................. G06F 16/9535 |
| 10,382,433 | B2 * | 8/2019 | Wang ...................... H04L 67/06 |
| 2003/0154194 | A1 | 8/2003 | Jonas |
| 2003/0195857 | A1 | 10/2003 | Acquisti |
| 2005/0108575 | A1 | 5/2005 | Yung |
| 2007/0226152 | A1 | 9/2007 | Jones |
| 2011/0314533 | A1 | 12/2011 | Austin et al. |
| 2012/0042042 | A1 | 2/2012 | Winkler et al. |
| 2013/0054598 | A1 | 2/2013 | Caceres |
| 2013/0124315 | A1 | 5/2013 | Doughty et al. |
| 2013/0124333 | A1 | 5/2013 | Doughty et al. |
| 2014/0040134 | A1 | 2/2014 | Ciurea |
| 2014/0040421 | A1 * | 2/2014 | Baldwin ................ H04L 45/24 709/217 |
| 2014/0059658 | A1 | 2/2014 | Stecher |
| 2014/0129459 | A1 * | 5/2014 | Baudy .................... G06Q 50/01 705/319 |
| 2014/0257999 | A1 | 9/2014 | Garcia-martinez |
| 2017/0034176 | A1 * | 2/2017 | Qi ........................ H04L 67/306 |
| 2017/0041376 | A1 * | 2/2017 | Lin ......................... H04L 67/06 |
| 2017/0155958 | A1 * | 6/2017 | Fu .......................... H04L 67/42 |
| 2017/0364697 | A1 | 12/2017 | Zhao et al. |
| 2018/0241801 | A1 * | 8/2018 | Zhu ......................... H04L 67/26 |

FOREIGN PATENT DOCUMENTS

| | | |
|---|---|---|
| CN | 104978383 A | 10/2015 |
| JP | 2009-059371 A | 3/2009 |
| JP | 2014-529129 A | 10/2014 |
| KR | 10-2014-0089543 A | 7/2014 |

OTHER PUBLICATIONS

Examination Report No. 2 for Australian Patent Application No. 2016364120 dated Jul. 2, 2019 (4 pages).
First Office Action for Chinese Patent Application No. 201510866768.1 dated Apr. 25, 2019 with English machine translation (9 pages).
Examination Report No. 1 for Australian Patent Application No. 2016364120 dated Apr. 17, 2019 (3 pages).
First Search for Chinese Patent Application No. 201510866768.1 dated Apr. 17, 2019 (1 page).
International Preliminary Report on Patentability Chapter I for PCT Application No. PCT/CN2016/106579 dated Jun. 5, 2018 (9 pages).
Search Report for European Application No. 16869891.8 dated May 22, 2019 (12 pages).
Acar et al., "The Web Never Forgets: Persistent Tracking Mechanisms in the Wild," Computer and Communications Security, Jan. 1, 2014, pp. 674-689 (16 pages).
Olejnik et al., "Selling Off Privacy at Auction," HAL, Feb. 24, 2014, p. 915249 (16 pages).
International Search Report and Written Opinion for Application No. PCT/CN2016/106579, dated Jan. 25, 2018, 8 pages.
Examination Report No. 3 for Australian Patent Application No. 2016364120 dated Oct. 28, 2019 (3 pages).
Notice to Submit Response for Korean Application No. 10-2018-7018756 dated Oct. 29, 2019 (7 pages).
Examination Report for Malaysian Application No. PI 2018702036 dated Mar. 9, 2020.
Examination Report No. 4 for Australian Application No. 2016364120 dated Apr. 9, 2020.
Office Action for Indonesian Application No. P00201804031 dated Apr. 14, 2020.

* cited by examiner

USER DATA SHARING METHOD AND DEVICE

CROSS REFERENCE TO RELATED APPLICATIONS

The present application is a continuation application of International Patent Application No. PCT/CN2016/106579, filed on Nov. 21, 2016, which claims priority to Chinese Patent Application No. 201510866768.1 filed on Dec. 1, 2015 and entitled "User Data Sharing Method and Device." The above-referenced applications are incorporated herein by reference in their entirety.

TECHNICAL FIELD

The present application relates to the field of computer technologies, and in particular, to a user data sharing method and device.

BACKGROUND

With the development of the Internet and informatization, users would apply information in different service platforms when conducting daily businesses, such as online shopping, online behaviors, financial services, insurance services, and the like. When carrying out these services, different service platforms would also record and accumulate user information accordingly, including service execution records and user behavior information derived therefrom.

Different types of service platforms constantly accumulate, respectively, user data information in different aspects. For example, service platforms of some e-commerce platforms constantly collect users' shopping and consumption information, service platforms of some other search engines constantly collect users' search information, while service platforms of some other financial management platforms collect users' deposit and financial management information. The same user entity would have different accounts on websites of different types of service platforms that collect different information. How to associate user information of the same user on different service platforms, how to pass user data between different service platforms, and how to achieve user behavior information sharing are very valuable and yet very difficult to be done.

However, due to the presence of a number of hurdles, such as user recognition, information interaction, categorized statistics, and the like, there is no solution in current technologies that can pass user behavior information with respect to the same user entity between different service platforms to share the user behavior information.

Therefore, there is an urgent need in current technologies to find a solution that can pass user behavior information with respect to the same user entity between different service platforms to share the user behavior information.

SUMMARY

Embodiments of the present disclosure provide a user data sharing method and device for passing user behavior information with respect to the same user entity between different service platforms and for sharing the user behavior information.

According to one aspect, a user data sharing method may comprise the following steps: acquiring information of a query medium; searching and obtaining, according to the information of the query medium, at least one user account related to the query medium and relationship information of the at least one user account from a medium network, the relationship information of the user account comprising: a strength of a relationship between the user account and the query medium and a strength of a relationship between the user account and other user accounts; constructing a local medium network by using the obtained at least one user account and relationship information of the at least one user account; determining a trusted account from the at least one user account by using the local medium network; acquiring user data of the trusted account and outputting the user data of the trusted account as the user data corresponding to the information of the query medium, so as to share the user data.

In some embodiments, the local medium network comprises a plurality of edges representing relationships between query media and user accounts, and relationship among user accounts; each of the edges is associated with an edge weight representing a relationship strength score; and the determining a trusted account from the at least one user account by using the local medium network comprises: using the local medium network to perform mixed sorting on the at least one user account, and to determine first N of the sorted user accounts as trusted accounts, N being a positive integer.

In some embodiments, the using the local medium network to perform mixed sorting on the at least one user account comprises: normalizing edge weights of the edges in the local medium network; performing an iterative calculation on the normalized edge weights until converging; calculating a comprehensive weight for each user account by using the edge weights after the converging; and sorting the at least one user account according to the comprehensive weights of all user accounts, to determine a trusted account.

In some embodiments, the using the local medium network to perform mixed sorting on the at least one user account comprises: normalizing edge weights of the edges in the local medium network; performing an iterative calculation on the normalized edge weights until converging; calculating a comprehensive weight for each query medium by using the edge weights after the converging; and sorting all query media according to the comprehensive weights of all query media, to determine a trusted medium.

According to another aspect, a network device may comprise: an acquiring module configured to acquire information of a query medium; a querying module configured to search and obtain, according to the information of the query medium acquired by the acquiring module, at least one user account related to the query medium and relationship information of the at least one user account from a medium network, the relationship information of the user account comprising: a strength of a relationship between the user account and the query medium and a strength of a relationship between the user account and other user accounts; a constructing module configured to construct a local medium network by using the at least one user account and relationship information of the at least one user account obtained by the querying module, edges in the local medium network comprising a relationship between a medium and a user account and a relationship between the user account and other user accounts, and an edge weight being a relationship strength score; a determining module configured to determine a trusted account from the at least one user account by using the local medium network; a processing module configured to acquire user data of the trusted account and output the user data of the trusted account as the user data corresponding to the information of the query medium, so as to share the user data.

According to another aspect, a user data sharing device may comprise a processor and a non-transitory computer-readable storage medium storing instructions that, when executed by the processor, cause the device to perform a method. The method may comprise: acquiring information of a query medium; searching and obtaining, according to the information of the query medium, at least one user account related to the query medium and relationship information of the at least one user account from a medium network, the relationship information of the user account comprising: a strength of a relationship between the user account and the query medium and a strength of a relationship between the user account and other user accounts; constructing a local medium network by using the obtained at least one user account and relationship information of the at least one user account; determining a trusted account from the at least one user account by using the local medium network; acquiring user data of the trusted account and outputting the user data of the trusted account as the user data corresponding to the information of the query medium, so as to share the user data.

According to another aspect, a user data sharing method implemented by one or more processors of a server may comprise: acquiring information of two or more query media; searching from a medium network to obtain, based at least on the information of two or more query media, one or more user accounts related to the query media and relationship information of the user accounts, the relationship information of the user accounts comprising: relationship strengths between each of the user accounts and each of the query media, and relationship strengths between each of the user accounts and other user accounts in the medium network; determining whether the information of at least two query media belongs to the same user account of the one or more user accounts; if the information of at least two query media belongs to the same user account, using the determined user account as a trusted account; and if the information of at least two query media does not belong to the same user account, constructing a local medium network by using the obtained user accounts and the relationship information of the user accounts.

The embodiments of the present disclosure disclose a user data sharing method and device. The method comprises: querying, according to acquired information of the query medium, at least one related user account and relationship information of the at least one related user account; constructing a local medium network by using the information obtained through the query; determining a trusted account from the at least one user account by using the local medium network; acquiring user data of the trusted account; and outputting the user data of the trusted account as the user data corresponding to the information of the query medium, so as to share the user data. As such, user behavior information with respect to the same user entity can be passed between different service platforms and the user behavior information can be shared.

DETAILED DESCRIPTION

The technical solutions of the present disclosure will be clearly and completely described below with reference to the accompanying drawings. Apparently, the described embodiments are merely some, rather than all, of the embodiments of the present disclosure. All other embodiments obtainable by a person skilled in the art on the basis of the embodiments of the present disclosure and without inventive effort shall fall within the scope of the present disclosure.

All databases of different service platforms can record some identity information (e.g., a user's cell phone number, ID number, bank card, and the like) and environment information (i.e., IP, WIFI, MAC, IMEI, and the like that have been used) of a user. The identity information and environment information can be collectively referred to as medium information. Since the same user provides the same medium information to different service platforms, the medium information can be used to pass data. The so-called passing data means that user behavior information with respect to the same user that has been collected by databases of different service platforms is acquired from the databases of different service platforms based on the same medium information above, thereby achieving data sharing for the user behavior information.

User searching through a single medium has a relatively low accuracy. In particular, many accounts could be obtained by using some public medium information, such as IP, MAC, and even cell phones (e.g., cell phone numbers), while these accounts do not necessarily belong to the same user. Thus, despite that a number of accounts can be obtained by using such a single piece of medium information, these accounts may not belong to the same user, and the acquired user behavior information may be from different users. The data acquired in such a manner have low accuracy, making it impossible to share user behavior information of the same user that has been collected by databases of different service platforms.

In some embodiments, the user behavior information can comprise, for example, a user's shopping information, a user's search information, and a user's deposit information.

For many service scenarios, moreover, accuracy is very important, and there is generally abundant medium information. Therefore, a better solution should be able to use multiple pieces of medium information to better search for or lock a user.

The technical solution according to the embodiments of the present disclosure uses multiple pieces of medium information to lock the same user. When multiple pieces of medium information are used to lock a user, it is confirmed that the pieces of medium information belong to the user. Furthermore, these pieces of medium information belonging to the same user are then used to match different accounts on different service platforms so as to acquire different accounts of the user on different service platforms, as well as user behavior information of corresponding accounts that has been collected in the databases of corresponding service platforms, i.e., acquiring user behavior information of the same user on different service platforms.

In some embodiments, all service platforms can share user behavior information of the same user that has been collected in the databases of different service platforms. For example, medium information belonging to the same user u can be used to match corresponding accounts on a service platform a, a service platform b, and a service platform c, i.e., to look for accounts of the user u on the service platform a, the service platform b, and the service platform c, and then user behavior information of the obtained accounts that has been collected in the databases of the service platform a, the service platform b, and the service platform c can be acquired. As a result, user behavior information of the user u on the service platform a, the service platform b, and the service platform c can be acquired, and the user behavior information is shared between the service platform a, the service platform b, and the service platform c.

Figure 1:
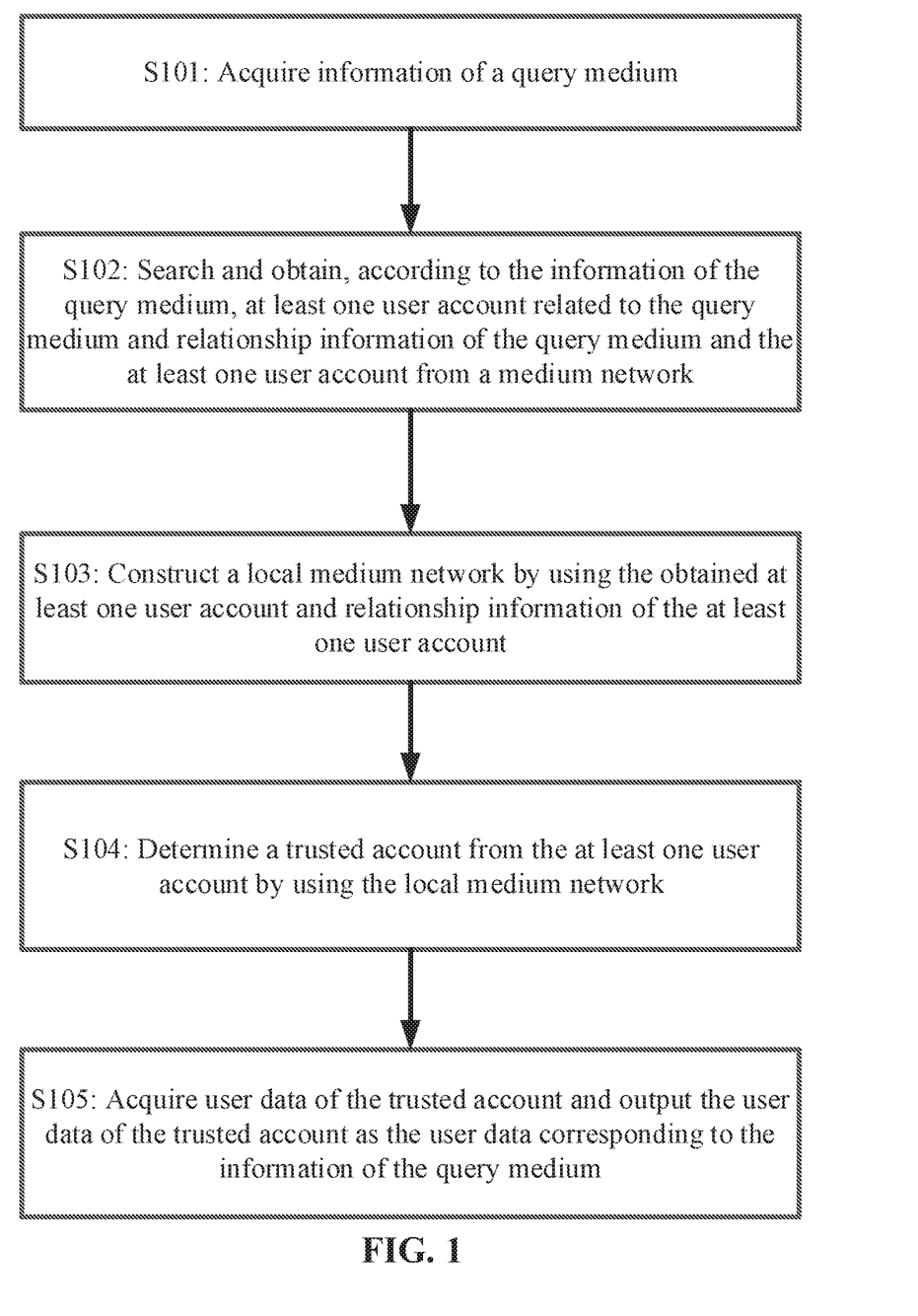
FIG. 1 is a flow chart of a user data sharing method according to various embodiments of the present disclosure.

FIG. 1 is a flow chart of a user data sharing method according to various embodiments of the present disclosure. In one example, the method comprises the following steps:

Step S101. Acquiring information of a query medium.

In some embodiments, a medium refers to a person or an entity that relates two parties (e.g., people or entities). A common medium comprises information related to one or more of an account, an ID, a cell phone, a mailbox, a bank card, a device code, an address, etc.

In one embodiment, a query medium refers to a medium that is used to query a target user's account in a medium network. At present, it can be determined that there is a high possibility for an association between these media and the target user's account. Therefore, the accuracy is relatively high when these media are used to query the target user. In a practical application, a medium that has been verified to match a user or that is exclusive can be selected as a query medium.

In some embodiments, more than two query media are required to be acquired for subsequent processing procedures, so as to improve the query accuracy and to reduce query result errors caused by using interfering information or less recognizable information as a query medium. The number of query media can be set according to the need of an actual scenario, and changes thereof do not affect the scope of the present disclosure.

Step S102. Searching and obtaining, according to the information of the query medium, at least one user account related to the query medium and relationship information of the query medium and the at least one user account from a medium network.

In some embodiments, the relationship information of the user account comprises: a strength of a relationship between the user account and the query medium, and a strength of a relationship between the user account and other user accounts.

In some embodiments, the medium network is a network comprising association relationships between user accounts and association relationships between user accounts and (query) media, and the medium network comprises a strength of a relationship between any user accounts and a strength of a relationship between a user account and a (query) medium.

If information of at least two query media (alternatively referred to as at least two pieces of query medium information) are acquired in the Step S101, the operation in this step S102 will be: searching and obtaining, by using the information of at least two query media respectively, user accounts related to the corresponding query media and respective relationship information of the query media and the user accounts from a medium network.

In some embodiments, a particular application scenario can comprise the following procession options. When user accounts related to the corresponding query media and relationship information of the user accounts are obtained from a medium network, the method can further comprise: determining whether the information of at least two query media belongs to the same user account; if yes, using the determined user account as a trusted account; otherwise, executing the step S103.

S103. Constructing a local medium network by using the obtained at least one user account and relationship information of the at least one user account. Thus, a user data sharing method implemented by one or more processors of a server may comprise: acquiring information of two or more query media; searching from a medium network to obtain, based at least on the information of two or more query media, one or more user accounts related to the query media and relationship information of the user accounts, the relationship information of the user accounts comprising: relationship strengths between each of the user accounts and each of the query media, and relationship strengths between each of the user accounts and other user accounts in the medium network; determining whether the information of at least two query media belongs to the same user account of the one or more user accounts; if the information of at least two query media belongs to the same user account, using the determined user account as a trusted account; and if the information of at least two query media does not belong to the same user account, constructing a local medium network by using the obtained user accounts and the relationship information of the user accounts.

In a practical application scenario, a flow to construct a local medium network is as follows: determining a strength of a relationship between a user account and a (query) medium according to a same-occurrence (e.g., when the user account and the medium are observed at the same time) relationship between the user account and the (query) medium, and determining a strength of a relationship between user accounts according to a relationship between users, wherein the relationship between users comprises social relationship (e.g., when the users are socially connected), transaction relationship (e.g., when the users involve in the same transaction), shared-device relationship (e.g., when the users share the same device), and shared-medium relationship (e.g., when the users share the same medium) between users.

In some embodiments, the local medium network comprises a plurality of edges representing relationships between media and user accounts, and relationship among user accounts. Each of the edges is associated with an edge weight representing a relationship strength score. In one example, the local medium network comprises vertices and edges, the vertices in the local medium network comprise media or user accounts, the edges in the local medium network comprise relationships between media and user accounts, and relationships between the user account and other user accounts, and an edge weight is a relationship strength score.

Figure 2:
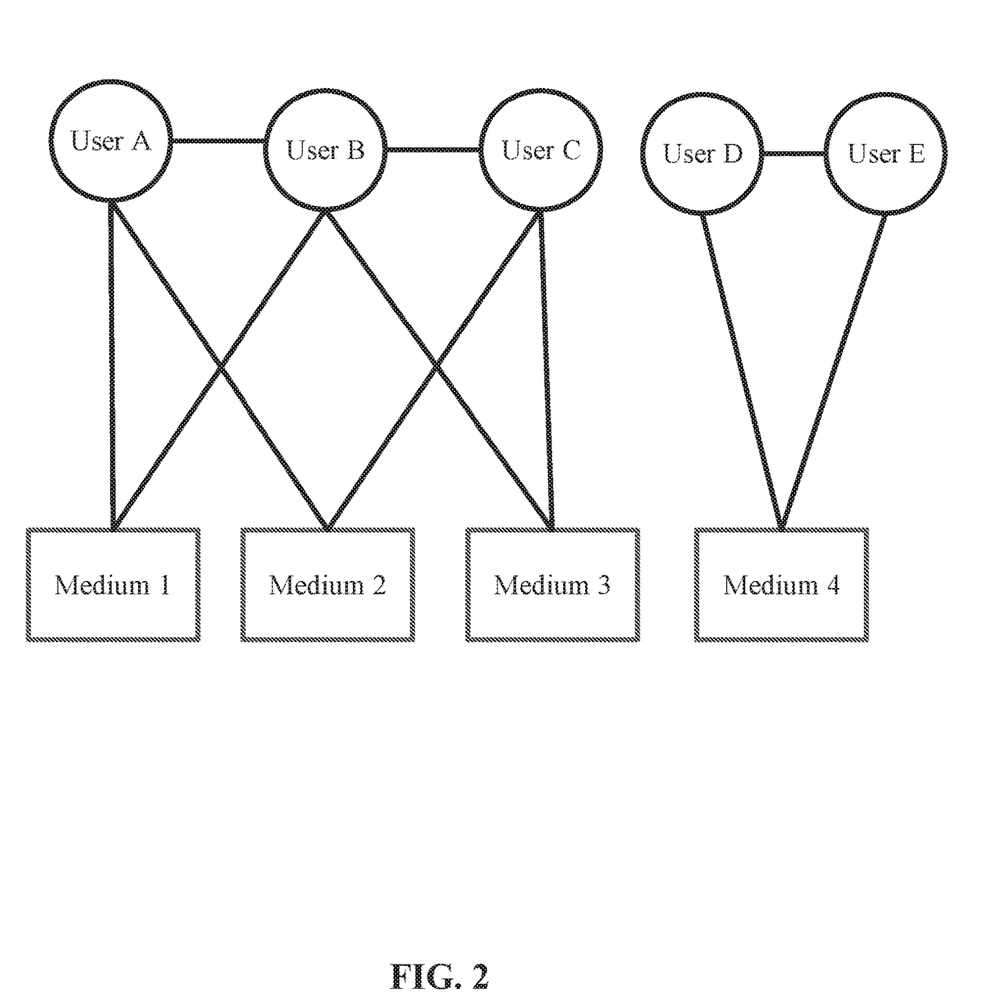
FIG. 2 is a schematic structural diagram of a local medium network according to various embodiments of the present disclosure.

FIG. 2 is a schematic structural diagram of a local medium network that is constructed according to various embodiments of the present disclosure, and the corresponding construction process is as follows:

First, acquiring medium information 1, medium information 2, medium information 3, and medium information 4 (corresponding to query media 1, 2, 3, and 4 respectively in this figure).

Then, in a medium network, finding corresponding accounts A and B according to the medium information 1, finding corresponding accounts A and C according to the medium information 2, finding corresponding accounts B and C according to the medium information 3, and finding corresponding accounts D and E according to the medium information 4. Accounts A, B, C, D, and E correspond to users A, B, C, D, and E respectively in this figure.

Lastly, constructing a local medium network according to the medium information 1, the medium information 2, the medium information 3, and the medium information 4, as well as the accounts A and B corresponding to the medium information 1, the accounts A and C corresponding to the medium information 2, the accounts B and C corresponding to the medium information 3, and the accounts D and E corresponding to the medium information 4, wherein the medium information 1, the medium information 2, the medium information 3, the medium information 4, the account A, the account B, the account C, and the account D are different vertices, and the lines connecting the vertices in the figure are edges that represent relationships between corresponding vertices.

Step S104. Determining a trusted account from the at least one user account by using the local medium network.

In one example, the local medium network constructed in the step S103 is used to perform mixed sorting on the at least one user account, and to determine first N of the sorted user accounts as trusted accounts.

In one example, in a practical application scenario, an implementation flow of the above mixed sorting is as follows:

Step 1. Normalization of edge weights, in which edge weights of the edges (e.g., all edges) in the local medium network are normalized, i.e., in the local medium network, an edge weight information normalizing operation is performed on original edge weight information between each piece of information of the query medium and a corresponding user account, and between the user accounts.

In some embodiments, the above edge weight information normalizing operation can be implemented in the following manner.

First, information of changing rates of original edge weights between information of the query medium and corresponding user accounts, and information of changing rates of original edge weights between user accounts within a first preset number of times can be acquired respectively.

According to the information of changing rates, the edge weight information normalizing operation can be performed on the original edge weights between information of the query medium and corresponding user accounts and on the original edge weights between user accounts.

In a practical application scenario, the implementation can be performed with reference to the following formula:

Formula I (logic regression formula):

$$f(x) = \frac{2}{1+e^{-ax}} - 1$$

Where f(x) is an edge weight value obtained after the edge weight information normalizing operation is performed, x in ax represents original edge weight value, and a is a variable in the logic regression formula, which can be obtained through the following formula:

Formula II (derivation formula):

$$\frac{f(x_0)'}{f(x_{99\%})'} = 100/1$$

Where $x_0$ represents the minimal value of original edge weights; $x_{99\%}$ represents a value of 99 percentile of edge weights.

Step 2. Iterative calculation of edge weights, in which an iterative calculation is performed on the normalized edge weights until converging. Namely, the iterative calculation is performed according to the edge weights between information of the query medium and corresponding user accounts, and to the edge weights between user accounts that are obtained from the edge weight information normalizing operation in the step 1 until the iterative result converges, obtaining edge weights between information of the query medium and corresponding user accounts and edge weights between user accounts.

For the purpose of easy description, mathematical symbols are defined as follows: the local medium network is defined as G, n represents node data in G, and a node can be either a user account or a medium.

In a practical application scenario, the above iterative operation can be performed with reference to the following formula:

Formula III (in the initial state, it is an edge weight information calculation formula in the $k^{th}$ iteration):

$$R_k(a,b) = \begin{cases} 1 & a = b \\ \text{score} & \text{edge } \langle a,b \rangle \text{ exists and edge weight is score} \\ 0 & \text{else} \end{cases}$$

In the iterative process, each edge's weight is re-calculated by using the following Formula IV (an edge weight information calculation formula in the $(k+1)^{th}$ iteration).

Formula IV:

$$R_{k+1}(a,b) = \frac{c}{|I(a)||I(b)|} \sum_{i=1}^{|I(a)|} \sum_{j=1}^{|I(b)|} R_k(I_i(a), I_j(b))$$

Wherein $R_k(a, b)$ represents edge weight information of node a and node b in the $k^{th}$ iteration, $R_{k+1}(a, b)$ represents edge weight information of node a and node b in the $(k+1)^{th}$ iteration, C represents a converging rate control parameter or attenuation factor, |I(a)| represents a sum of edge weight information of a neighbor list of node a, |I(b)| represents a sum of edge weight information of a neighbor list of node b, i represents No. i, j represents No. j, $I_i(a)$ represents information of a neighbor list of node a, and $I_j(b)$ represents information of a neighbor list of node b. (In a local medium network, medium information and accounts corresponding to the medium information are referred to as nodes, other nodes connected to a node are referred to as neighbors of the node, and all neighbors are referred to as a neighbor list).

In some embodiments, the goal of performing the iterative calculation on edge weights is to cause the obtained edge weight information between nodes to become steady, i.e., converging, rather than infinitely iterating; therefore, it is necessary to determine whether the obtained edge weight information between nodes has satisfied converging conditions after a preset number of iterative calculation operations has been performed.

In some embodiments, whether the obtained edge weight information between nodes has satisfied the converging conditions can be determined in the following manner: after a first preset number of iterative calculation operations has been performed, acquiring first value changes of new edge weights between the user accounts and corresponding information of the query medium and second value changes of edge weights between the user accounts, respectively; determining whether a sum of the first value changes and the second value changes is smaller than a preset first sum threshold; if yes, stopping the iterative calculation operation; if no, continuing the iterative calculation operation.

Step 3. Determination of comprehensive weight information, in which the edge weights after the converging are used to calculate a comprehensive weight for each user account or a comprehensive weight for each query medium.

Comprehensive weight information of the user accounts and comprehensive weight information of the information of the query medium are determined according to the edge weights between user accounts and edge weights between user accounts and corresponding media.

In a practical application scenario, the implementation can be performed with reference to the following formula:

Formula V (a medium weight information calculation formula):

$$W(a) = \begin{cases} 1 & a \text{ is type of } certno \\ 0.8 & a \text{ is type of phone} \\ 0.6 & a \text{ is type of } mac \\ 0.5 & a \text{ is other type} \end{cases}$$

Where W(a) is medium weight. Different query media usually have different weights. For example, as a query medium, an ID typically has a more trusted result than that of a cell phone query, and therefore has a higher weight. Since different types of query media have different accuracies (confidence levels) in user query, the weights thereof should be different. The medium weight is typically assigned according to service experience and understanding. Therefore, different medium weights are set according to different media types.

Formula VI (a comprehensive weight information calculation formula for each user account):

$$Score(u) => \Sigma_{a \in S} W(a)*R(a,u) + \Sigma_{(a,b) \in S} W(a)*W(b)*R(a,b)$$

Where u represents a user account u in the local medium network, S represents a medium information set S formed by medium information corresponding to the user account u, and Score(u) represents comprehensive weight information of the user account u;

W(a)*R(a, u) represents edge weight information between the user account u and each piece of corresponding medium information thereof;

W(a)*W(b)*R(a, b) represents edge weight information between medium information corresponding to the user account u.

Step 4. Sorting of comprehensive weights, in which the user accounts or query media are sorted according to the comprehensive weights of the user accounts or the comprehensive weights of the query media obtained in the step 3 to determine a trusted account or a trusted medium.

In one example, the local medium network can be used to perform mixed sorting on the at least one user account, and to determine first N of the sorted user accounts as trusted accounts, N being a positive integer.

N can be a numerical value set according to needs of an actual scenario, e.g., N=1. The user account ranked the first is the most trusted account with a credibility value being the comprehensive weight score of the user account. The medium related to the most trusted account is a trusted medium, and similarly, the credibility value is the comprehensive weight score of the medium.

With regard to determining a trusted medium, a medium related to a trusted user can be directly determined to be a trusted medium, and the medium belongs to a trusted account.

If there is a non-trusted medium and the degree of similarity (R) between the non-trusted medium and a trusted medium is smaller than a threshold (e.g., 0.01), then it is regarded that this medium is untrusted, i.e., the medium does not belong to a trusted account.

Step S105. Acquiring user data of the trusted account and outputting the user data of the trusted account as the user data corresponding to the information of the query medium, so as to share the user data.

In a practical application scenario, the operation manner to implement user data sharing can comprise as follows: acquiring, according to at least two pieces of medium information corresponding to the trusted account and from different databases, user behavior information of a user corresponding to the trusted account that has been recorded in the different databases, so as to share the user behavior information.

In some embodiments, after the acquiring, according to at least two pieces of medium information corresponding to the trusted account and from different databases, user behavior information of a user corresponding to the trusted account that has been recorded in the different databases, other medium information corresponding to the trusted account can be further acquired from the above local medium network, and the medium information can be used as non-trusted medium information. In some embodiments, non-trusted medium information is not untrusted medium information. Therefore, in the exemplary embodiments, it is necessary to determine whether the non-trusted medium information is untrusted medium information.

In one example, whether the non-trusted medium information is untrusted medium information can be determined in the following manner:

Step A: acquiring a degree of similarity between the non-trusted medium information and the medium information corresponding to the trusted account.

In some embodiments, the degree of similarity may correspond to the number of identical adjacent edges between the non-trusted medium information and related trusted medium information.

In some embodiments, a higher number of identical adjacent edges between the non-trusted medium information and related trusted medium information indicates a higher degree of similarity between the non-trusted medium information and the medium information corresponding to the trusted account. Conversely, a lower number indicates a lower degree of similarity.

In a practical application, a trusted medium can be directly determined, and the trusted medium belongs to a trusted account. If there is a non-trusted medium and the degree of similarity (R) between the non-trusted medium and a trusted medium is smaller than a threshold (e.g., 0.01), then it is regarded that this medium is untrusted, i.e., the medium does not belong to a trusted account.

Step B: comparing the degree of similarity with a preset degree of similarity threshold;

Step C: treating non-trusted medium information with the degree of similarity smaller than the preset degree of similarity threshold as untrusted medium information.

On the other hand, edge weight information between different medium information and accounts is different. For example, an ID typically has a more trusted user query result than what a cell phone has, and therefore the ID has a higher weight. In addition, since different types of medium information have different accuracies (confidence levels) in user query, the edge weight information thereof should be different. Therefore, after the acquiring, according to at least two pieces of medium information corresponding to the trusted account and from different databases, user behavior information of a user corresponding to the trusted account that has been recorded in the different databases, a strength of a relationship between each piece of medium information corresponding to the trusted account and the trusted account can be further determined, and the relationship strength refers to an accuracy of user query according to medium information. In one example, the implementation can be performed in the following manner.

Step A: acquiring second comprehensive edge weight information of each piece of medium information corresponding to the trusted account, respectively, wherein the second comprehensive edge weight information is comprehensive edge weight information between each piece of medium information and an account formed by corresponding accounts of the medium information.

In one example, the above second comprehensive edge weight information can be determined in the following manner:

Formula VII (a second comprehensive edge weight information calculation formula):

$$Score(m) = \Sigma_{a \in k} Score(a)*R(a,m) + \Sigma_{(a,b) \in k} Score(a)*Score(b)*R(a,b)$$

Where m represents medium information m in the local medium network, K represents an account set K formed by accounts corresponding to the medium information m, and Score(m) represents second comprehensive edge weight information; Score(a)*R(a,m) represents edge weight information between the medium information m and each corresponding user thereof; Score(a)*Score(b)*R(a, b) represents edge weight information between users corresponding to the medium information m.

Step B: sorting the second comprehensive edge weight information.

Step C: determining a strength of relationship between each piece of medium information and the trusted account according to the sorting result.

The embodiments of the present disclosure disclose a user data sharing method and device. The method comprises: querying, according to acquired information of the query medium, at least one related user account and relationship information of the at least one related user account; constructing a local medium network by using the information obtained through the query; determining a trusted account from the at least one user account by using the local medium network; acquiring user data of the trusted account; and outputting the user data of the trusted account as the user data corresponding to the information of the query medium, so as to share the user data. As such, user behavior information with respect to the same user entity is passed between different service platforms and the user behavior information is shared.

Figure 3:
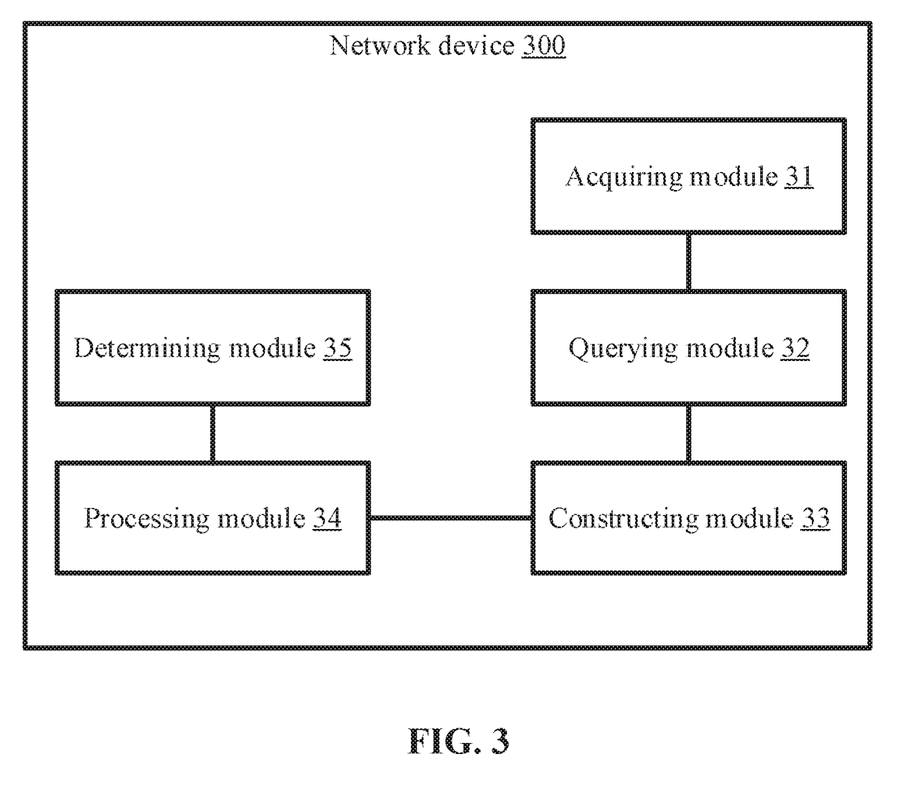
FIG. 3 is a schematic structural diagram of a network device according to various embodiments of the present disclosure.

FIG. 3 is a schematic structural diagram of a network device 300 according to various embodiments of the present disclosure. As shown in FIG. 3, the network device 300 may comprise:

an acquiring module 31 configured to acquire information of a query medium;

a querying module 32 configured to search and obtain, according to the information of the query medium acquired by the acquiring module 31, at least one user account related to the query medium and relationship information of the at least one user account from a medium network, the relationship information of the user account comprising: a strength of a relationship between the user account and the query medium, and a strength of a relationship between the user account and other user accounts;

a constructing module 33 configured to construct a local medium network by using the at least one user account and relationship information of the at least one user account obtained by the querying module 32, edges in the local medium network comprising a relationship between a medium and a user account and a relationship between the user account and other user accounts, and an edge weight being a relationship strength score;

a determining module 34 configured to determine a trusted account from the at least one user account by using the local medium network;

a processing module 35 configured to acquire user data of the trusted account and output the user data of the trusted account as the user data corresponding to the information of the query medium, so as to share the user data.

In a practical application scenario, the determining module 34 is configured to: use the local medium network to perform mixed sorting on the at least one user account, and to determine first N of the sorted user accounts as trusted accounts, N being a positive integer.

In some embodiments, the determining module 34 comprises:

a normalizing unit configured to normalize edge weights of the edges in the local medium network;

an iteration unit configured to perform an iterative calculation on the edge weights normalized by the normalizing unit until converging;

a calculating unit configured to calculate a comprehensive weight for each user account or a comprehensive weight for each query medium by using the edge weights after the converging by the iteration unit;

a sorting unit configured to sort the at least one user account or all query media according to the comprehensive weights of all user accounts or comprehensive weights of all query media calculated by the calculating unit, and determine a trusted account or a trusted medium.

In some embodiments, the acquiring module 31 is configured to acquire information of at least two query media; the querying module 32 is, for example, configured to search and obtain, by using the information of at least two query media respectively, user accounts related to the corresponding query media and relationship information of the user accounts from a medium network.

Correspondingly, the constructing module 33 is configured to: determine whether the information of at least two query media belongs to the same user account; if yes, use the determined user account as a trusted account; otherwise, construct a local medium network by using the obtained at least one user account and relationship information of the at least one user account.

In some embodiments, the various modules and units of the network device 300 may be implemented as software instructions. That is, the network device 300 may comprise a processor and a non-transitory computer-readable storage medium storing instructions that, when executed by the processor, cause the network device 300 to performed various steps and methods of the modules and units described above. The network device 300 may be implemented for example on a server.

The embodiments of the present disclosure disclose a user data sharing method and device. The method comprises: querying, according to acquired information of the query medium, at least one related user account and relationship information of the at least one related user account; constructing a local medium network by using the information obtained through the query; determining a trusted account from the at least one user account by using the local medium network; acquiring user data of the trusted account; and outputting the user data of the trusted account as the user data corresponding to the information of the query medium, so as to share the user data. As such, user behavior information with respect to the same user entity is passed between different service platforms and the user behavior information is shared.

According to the description of the above manners of implementation, a person skilled in the art can clearly understand that the embodiments of the present disclosure can be implemented by hardware or by software plus a necessary general hardware platform. On the basis of such an understanding, the technical solution of the embodiments of the present disclosure can be embodied in the form of a software product. The software product can be stored in a non-volatile storage medium (which can be CD-ROM, a flash drive, a mobile hard drive, and the like), comprising a number of instructions to enable a computer device (which can be a personal computer, a server, or a network side device) to carry out the methods set forth in all implementation scenarios of the embodiments of the present disclosure.

A person skilled in the art should understand that the accompanying drawings are merely illustrations of implementation scenarios, and modules or flows in the accompanying drawings may not necessarily required by the implementation of the embodiments of the present disclosure.

A person skilled in the art should understand that the modules in the device in the implementation scenario can be distributed in the device of the implementation scenario according to the description of the implementation scenario, or can undergo corresponding variations to be disposed on one or more devices that are different from the present implementation scenario. The modules in the above implementation scenario can be combined into one module, or can be further separated into a plurality of sub-modules.

The above order numbers of the embodiments of the present disclosure are only for the purpose of description and do not represent merits or disadvantages of the implementation scenarios.

The embodiments of the present disclosure are not limited by the disclosed embodiments. Any variations that can be conceived by a person skilled in the art shall fall within the scope of the embodiments of the present disclosure.

What is claimed is:

1. A user data sharing method, comprising:
acquiring information of a query medium, wherein the query medium is a medium for querying a target user account;
searching and obtaining, according to the information of the query medium, at least one user account related to the query medium and relationship information of the at least one user account from a medium network, the relationship information of the user account comprising: a strength of a relationship between the user account and the query medium and a strength of a relationship between the user account and other user accounts, wherein the relationship between the user account and the query medium includes same-occurrence relationship, and the relationship between the user account and the other user accounts includes one or more of social relationship, transaction relationship, shared-device relationship and shared-medium relationship;
constructing a local medium network by using the obtained at least one user account and the relationship information of the at least one user account, wherein the local medium network comprises a plurality of edges representing relationships between query media and user accounts, and relationships among user accounts, and each of the edges is associated with an edge weight representing a relationship strength score;
determining a trusted account from the at least one user account by using the local medium network comprising
using the local medium network to perform mixed sorting on the at least one user account, and to determine first N of the sorted user accounts as trusted accounts, N being a positive integer, wherein the using the local medium network to perform mixed sorting on the at least one user account comprises:
normalizing edge weights of the edges in the local medium network;
performing an iterative calculation on the normalized edge weights until converging;
calculating a comprehensive weight for each user account by using the edge weights after the converging; and
sorting the at least one user account according to the comprehensive weights of all user accounts, to determine the trusted account; and
acquiring user data of the trusted account and outputting the user data of the trusted account as the user data corresponding to the information of the query medium.

2. The method according to claim 1, wherein the using the local medium network to perform mixed sorting on the at least one user account comprises:
calculating a comprehensive weight for each query medium by using the edge weights after the converging; and
sorting all query media according to the comprehensive weights of all query media, to determine a trusted medium.

3. The method according to claim 1, wherein the normalizing edge weights of the edges in the local medium network comprises:
acquiring changing rates of original edge weights between the information of the query medium and corresponding user accounts and changing rates of original edge weights between user accounts within a first preset number of times, respectively; and
according to the changing rates, performing an edge weight information normalizing operation on the original edge weights between the information of the query medium and corresponding user accounts and on the original edge weights between user accounts.

4. The method according to claim 1, wherein the performing an iterative calculation on the normalized edge weights until converging comprises:
performing an iterative calculation operation according to the edge weights between the information of the query medium and corresponding user accounts and the edge weights between user accounts that are obtained from normalizing the edge weights, to determine edge weights between the user accounts and the corresponding information of the query medium and edge weights between the user accounts, respectively;

after a first preset number of iterative calculation operations has been performed, acquiring first value changes of new edge weights between the user accounts and the corresponding information of the query medium and second value changes of edge weights between the user accounts, respectively;

determining whether a sum of the first value changes and the second value changes is smaller than a preset first sum threshold;

if the sum is smaller than the preset first sum threshold, stopping the iterative calculation operation; and if the sum is not smaller than the preset first sum threshold, continuing the iterative calculation operation.

5. The method according to claim 1, wherein:
the acquiring information of a query medium comprises: acquiring information of at least two query media; and
the searching and obtaining, according to the information of the query medium, at least one user account related to the query medium and relationship information of the at least one user account from a medium network comprises: searching and obtaining, by using the information of the at least two query media respectively, user accounts related to the corresponding query media and relationship information of the user accounts from the medium network.

6. The method according to claim 5, wherein after the searching and obtaining, by using the information of at least two query media respectively, user accounts related to the corresponding query media and relationship information of the user accounts from a medium network, the method further comprises:
determining whether the information of the at least two query media belongs to a same user account;
if the information of the at least two query media belongs to the same user account, using the determined user account as the trusted account; and
if the information of the at least two query media does not belong to the same user account, constructing the local medium network by using the obtained at least one user account and the relationship information of the at least one user account.

7. A user data sharing device, comprising a processor and a non-transitory computer-readable storage medium storing instructions that, when executed by the processor, cause the device to perform a method, the method comprising:
acquiring information of a query medium, wherein the query medium is a medium for querying a target user account;
searching and obtaining, according to the information of the query medium, at least one user account related to the query medium and relationship information of the at least one user account from a medium network, the relationship information of the user account comprising: a strength of a relationship between the user account and the query medium and a strength of a relationship between the user account and other user accounts, wherein the relationship between the user account and the query medium includes same-occurrence relationship, and the relationship between the user account and the other user accounts includes one or more of social relationship, transaction relationship, shared-device relationship and shared-medium relationship;

constructing a local medium network by using the obtained at least one user account and the relationship information of the at least one user account, wherein the local medium network comprises a plurality of edges representing relationships between query media and user accounts, and relationships among user accounts, and each of the edges is associated with an edge weight representing a relationship strength score;

determining a trusted account from the at least one user account by using the local medium network comprising using the local medium network to perform mixed sorting on the at least one user account, and to determine first N of the sorted user accounts as trusted accounts, N being a positive integer, wherein the using the local medium network to perform mixed sorting on the at least one user account comprises:
normalizing edge weights of the edges in the local medium network;
performing an iterative calculation on the normalized edge weights until converging;
calculating a comprehensive weight for each user account by using the edge weights after the converging; and
sorting the at least one user account according to the comprehensive weights of all user accounts, to determine a trusted account; and
acquiring user data of the trusted account and outputting the user data of the trusted account as the user data corresponding to the information of the query medium.

8. The device according to claim 7, wherein the using the local medium network to perform mixed sorting on the at least one user account comprises:
calculating a comprehensive weight for each query medium by using the edge weights after the converging; and
sorting all query media according to the comprehensive weights of all query media, to determine a trusted medium.

9. The device according to claim 7, wherein the normalizing edge weights of the edges in the local medium network comprises:
acquiring changing rates of original edge weights between the information of the query medium and corresponding user accounts and changing rates of original edge weights between user accounts within a first preset number of times, respectively; and
according to the changing rates, performing an edge weight information normalizing operation on the original edge weights between the information of the query medium and corresponding user accounts and on the original edge weights between user accounts.

10. The device according to claim 7, wherein the performing an iterative calculation on the normalized edge weights until converging comprises:
performing an iterative calculation operation according to the edge weights between the information of the query medium and corresponding user accounts and the edge weights between user accounts that are obtained from normalizing the edge weights, to determine edge weights between the user accounts and the corresponding information of the query medium and edge weights between the user accounts, respectively;

after a first preset number of iterative calculation operations has been performed, acquiring first value changes of new edge weights between the user accounts and corresponding information of the query medium and second value changes of edge weights between the user accounts, respectively;

determining whether a sum of the first value changes and the second value changes is smaller than a preset first sum threshold;

if the sum is smaller than the preset first sum threshold, stopping the iterative calculation operation; and if the sum is not smaller than the preset first sum threshold, continuing the iterative calculation operation.

11. The device according to claim 7, wherein:

the acquiring information of a query medium comprises: acquiring information of at least two query media; and the searching and obtaining, according to the information of the query medium, at least one user account related to the query medium and relationship information of the at least one user account from a medium network comprises: searching and obtaining, by using the information of the at least two query media respectively, user accounts related to the corresponding query media and relationship information of the user accounts from the medium network.

12. The device according to claim 11, wherein after the searching and obtaining, by using the information of at least two query media respectively, user accounts related to the corresponding query media and relationship information of the user accounts from a medium network, the method further comprises:

determining whether the information of the at least two query media belongs to a same user account;

if the information of the at least two query media belongs to the same user account, using the determined user account as the trusted account; and if the information of the at least two query media does not belong to the same user account, constructing the local medium network by using the obtained at least one user account and the relationship information of the at least one user account.

* * * * *